United States Patent
Gleu

(10) Patent No.: US 9,435,393 B2
(45) Date of Patent: Sep. 6, 2016

(54) AIR SPRING STRUT

(71) Applicant: Continental Teves AG & Co. oHG, Frankfurt (DE)

(72) Inventor: Jens Uwe Gleu, Langenhagen (DE)

(73) Assignee: Continental Teves Ag & Co. oHG (DE)

(*) Notice: Subject to any disclaimer, the term of this patent is extended or adjusted under 35 U.S.C. 154(b) by 0 days.

(21) Appl. No.: 14/411,615

(22) PCT Filed: Jun. 20, 2013

(86) PCT No.: PCT/EP2013/062871
§ 371 (c)(1),
(2) Date: Dec. 29, 2014

(87) PCT Pub. No.: WO2014/005847
PCT Pub. Date: Jan. 9, 2014

(65) Prior Publication Data
US 2015/0159725 A1    Jun. 11, 2015

(30) Foreign Application Priority Data
Jul. 3, 2012  (DE) .......... 10 2012 211 491

(51) Int. Cl.
*F16F 9/38* (2006.01)
*F16F 9/05* (2006.01)
(Continued)

(52) U.S. Cl.
CPC ............ *F16F 9/38* (2013.01); *B60G 15/12* (2013.01); *F16F 9/05* (2013.01); *F16F 9/084* (2013.01); *B60G 2202/31* (2013.01); *F16F 2230/105* (2013.01)

(58) Field of Classification Search
CPC .............. F16F 9/38; F16F 9/084; F16F 9/05; F16F 9/055; F16F 2230/105

USPC .......... 188/322.12; 267/64.19, 64.21, 64.23, 267/64.24, 64.27, 122; 280/124.157, 280/124.158
See application file for complete search history.

(56) References Cited

U.S. PATENT DOCUMENTS 4,529,213 A * 7/1985 Goodman ............... 188/322.12
5,015,002 A * 5/1991 Goodman et al. ....... 188/322.12
(Continued)

FOREIGN PATENT DOCUMENTS

DE      2125117      12/1972
DE      10302495     9/2003
(Continued)

OTHER PUBLICATIONS

German Search Report mailed in German Application No. 10 2013 211 644.6, including partial translation.
(Continued)

*Primary Examiner* — Thomas J Williams
(74) *Attorney, Agent, or Firm* — RatnerPrestia

(57) ABSTRACT

An air spring strut including an air spring and a damper for springing and damping vibrations of a motor vehicle chassis, the air spring strut being clamped between the body and the chassis of the motor vehicle, including an elastomer air spring bellows clamped between an air spring cover and an air spring rolling piston in an air-tight manner, and which rolls on the air spring rolling piston while forming a rolling fold; an outer guide surrounds the air spring bellows in a sleeve-like manner; a bellows protects the rolling fold from accumulating dirt and is fixed to an outer guide end facing away from the air spring cover; and a vent ventilates a space surrounded by the bellows. The vent has ventilation openings on a bellows end facing the chassis, and additional ventilation openings in the bellows for facilitating air flow within the bellows in the direction of the chassis.

10 Claims, 3 Drawing Sheets

(51) Int. Cl.
    *B60G 15/12* (2006.01)
    *F16F 9/084* (2006.01)

(56) References Cited

U.S. PATENT DOCUMENTS

| | | | |
|---|---|---|---|
| 5,402,868 A * | 4/1995 | Handke et al. | 188/322.12 |
| 6,460,665 B1 * | 10/2002 | Gotz et al. | 188/322.12 |
| 6,893,009 B2 | 5/2005 | Brehm | |
| 6,932,356 B2 * | 8/2005 | Gloaguen | 277/636 |
| 7,416,064 B2 * | 8/2008 | Beck | 188/322.12 |
| 2006/0012089 A1 | 1/2006 | Beck | |
| 2012/0112392 A1 | 5/2012 | Oldenettel | |
| 2014/0042679 A1 * | 2/2014 | Chen | 267/122 |

FOREIGN PATENT DOCUMENTS

| | | |
|---|---|---|
| DE | 10302211 | 8/2004 |
| DE | 102005028754 | 4/2007 |
| DE | 102006027476 | 12/2007 |
| DE | 102009003829 | 10/2010 |
| FR | 2138839 | 1/1973 |
| GB | 1384012 | 2/1975 |
| WO | 2011065041 | 6/2011 |

OTHER PUBLICATIONS

International Search Report for International Application No. PCT/EP2013/062871 mailed Aug. 9, 2013.

* cited by examiner

AIR SPRING STRUT

CROSS REFERENCE TO RELATED APPLICATION

This application is the U.S. National Phase Application of PCT International Application No. PCT/EP2013/062871, filed Jun. 20, 2013, which claims priority to German Patent Application No. 10 2012 211 491.2, filed Jul. 3, 2012, the contents of such applications being incorporated by reference herein.

FIELD OF THE INVENTION

The invention relates to an air spring strut comprising an air spring and a damper for spring suspension and damping of vibrations of a motor vehicle chassis, which air spring strut is clamped between the body and the chassis of the motor vehicle, with an air spring bellows which is composed of elastomeric material, is clamped in an airtight manner between an air spring cover and an air spring rolling piston and rolls on the air spring piston with the formation of a rolling fold, with an outer guide enclosing the air spring bellows in a sleeve-shaped manner, and an expansion bellows which protects the rolling fold from dirt accumulations and which is fastened to an end of the outer guide that faces away from the air spring cover.

BACKGROUND OF THE INVENTION

Air spring struts or air springs which are clamped between the chassis and the body and which have an air spring bellows which, in turn, is fastened between an air spring cover and a rolling piston are known in a multiplicity of embodiments. The air spring is under an internal positive pressure during operation.

The air spring bellows rolls under load and in the event of spring movements, with a rolling fold being formed on the outer contour of the concentric air spring rolling piston which, in the case of an air spring strut, is fastened to a cylinder tube of the damper.

In the case of air springs in the passenger vehicle sphere, use is made of air spring bellows with as thin a wall as possible, since these ensure a high rolling comfort. In order to achieve a sufficient load-bearing capacity of the entire system with said air spring bellows, the air spring bellows or the air springs or dampers are provided with what are referred to as outer guides, namely with a tubular sleeve in the form of a "supporting corset" or supporting body surrounding the air spring bellows. For example, a thin air spring bellows with a thin light metal sleeve as the supporting body can thus be optimized to high internal pressures and therefore high load-bearing capacities with the harshness behavior being good at the same time. The outer guides here are designed and arranged in such a manner that the air spring bellows can firstly run along the outer side of the air spring rolling piston and secondly on the inner surface of the outer guide.

However, this has the disadvantage that, in contrast to thick-walled and therefore more robust air spring bellows in the utility vehicle sphere, such air spring bellows react very much more sensitively to deposits on the rolling surfaces or even foreign bodies to be rolled over. The comfortable air spring bellows very easily reacts to the rolling over of deposits or foreign bodies with a high degree of abrasion or destruction of its delicate strength support, which may result in the air spring failing.

In order to counter this, use is made of an expansion bellows, in particular in the case of externally guided air springs, in order to protect the air spring bellows from dirt accumulations (for example dust, sand and gravel from the road during the driving mode), as is known, for example, from DE10302495A1, which is incorporated by reference. However, the use of an expansion bellows gives rise to the problem that, in the case of spring movements of the air spring, the air volume of the space surrounded by the expansion bellows changes at the same time and therefore a gas exchange between the air trapped by the expansion bellows and the soiled air has to take place on the outside.

For this purpose, for example, the air spring device known from DE102009003829A1, which is incorporated by reference has ventilation in the form of ventilation bores in a collar of the outer guide, wherein, in the case of the described overhead position of the air spring device, the collar of the outer guide faces the chassis. The ventilation of the expansion bellows therefore takes place at the foot of the expansion bellows.

In the case of an air spring strut, the connection of the expansion bellows on the side facing away from the carriageway customarily takes place in as fixed and tight manner as possible such that only little gas exchange if any at all takes place here. This is intended to ensure that no dirt can enter the expansion bellows interior from above and the dirt which has entered by being sucked in can pass to the outside again in the direction of the chassis.

The arrangement of the expansion bellows ventilation at the expansion bellows foot, which faces the chassis, leads to the situation in which, in the event of spring deflection movements of the air spring, because of the associated reduction in volume in the expansion bellows interior, the air is ejected downward in the direction of the chassis, and at the same time the air spring bellows on the outer guide releases an increasing region of the contact surface and covers a potentially soiled region on the air spring rolling piston.

During rebound movements of the air spring, because of the increase in volume in the expansion bellows interior, potentially soiled air is sucked in from below, at the same time the air spring bellows on the outer guide covers an increasing and potentially soiled region of the contact surface and exposes the contact surface on the piston.

It is therefore disadvantageous that, in the event of spring movements, dust and/or foreign bodies are sucked into the interior of the expansion bellows. This is problematic if said material does not pass again to the outside, but rather gets into the rolling region of the air spring bellows, as a result of which the expansion bellows has lost its required protective function and damage to the air spring bellows is not ruled out.

SUMMARY OF THE INVENTION

An aspect of the invention provides an air spring strut which is improved in this respect and in which the disadvantages mentioned can be avoided.

The air spring strut according to an aspect of the invention comprises an air spring and a damper for spring suspension and damping vibrations of a motor vehicle, which air spring strut is clamped between the body and the chassis of the motor vehicle, and has an air spring bellows which is composed of elastomeric material, is clamped in an airtight manner between an air spring cover and an air spring rolling piston and rolls on the air spring piston with the formation of a rolling fold, and an outer guide enclosing the air spring bellows in a sleeve-shaped manner, and an expansion bellows which protects the rolling fold from dirt accumulations and which is fastened to an end of the outer guide that faces away from the air spring cover, and ventilation means for ventilating a space surrounded by the expansion bellows, wherein the ventilation means comprise ventilation openings at an end of the expansion bellows that faces the chassis, and further additional ventilation openings are provided in the expansion bellows, said ventilation openings assisting an airflow within the expansion bellows in the direction of the chassis. By means of the further ventilation openings, the flow conditions, in particular during rebound movements, fundamentally change, and therefore a sucking of the air into the interior of the expansion bellows can be substantially reduced.

The additional ventilation openings advantageously have, according to a development of the invention, a flow resistance which is smaller than a flow resistance of the ventilation openings. By means of the additional ventilation openings, a greater amount of air can therefore be sucked up, said air being combined with the air flow through the ventilation openings at the foot end of the expansion bellows.

According to an advantageous embodiment of the invention, the additional ventilation openings are arranged following a fastening region of the expansion bellows to the outer guide. The region is generally of cylindrical configuration, and therefore the additional ventilation openings can be provided therein in a simple manner.

However, according to an alternative embodiment of the invention, it is also possible, in the case of expansion bellows of elongate design, to arrange the additional ventilation openings in a central region of the expansion bellows.

Nonreturn means are preferably provided in the region of the additional ventilation openings and at least make an outlet of air from the expansion bellows more difficult. During spring deflection movements, an undesirable air flow in the direction of the air spring bellows can thereby be prevented.

According to an advantageous development of the invention, means for controlling the air flow within the expansion bellows are provided in the region of the additional ventilation openings, and therefore it can be ensured that the air flowing through the additional ventilation openings is deflected away from the rolling fold.

The nonreturn means are preferably provided at the same time for controlling the air flow within the expansion bellows. This single-part realization of the two functions in particular facilitates the installation of the air spring.

According to a simple and cost-effective embodiment, as nonreturn means serving at the same time for controlling the air flow, an annular rubber element can be provided, which covers the additional ventilation openings on an inner side of the expansion bellows.

In order to simplify the fastening of the annular rubber element, according to an advantageous embodiment said rubber element can be provided fastened between the outer guide and a fastening element of the expansion bellows.

In a further advantageous embodiment of the invention, one or more filter elements are arranged in the region of the additional ventilation openings. Sucking in of soiled air through the additional ventilation openings can therefore be prevented.

BRIEF DESCRIPTION OF THE DRAWINGS

Further features, advantages and possibilities of using the invention are revealed in the dependent claims and the description below of exemplary embodiments and with reference to the drawing, in which, in each case in highly schematized form and in section:

DETAILED DESCRIPTION OF THE PREFERRED EMBODIMENTS

Figure 1:
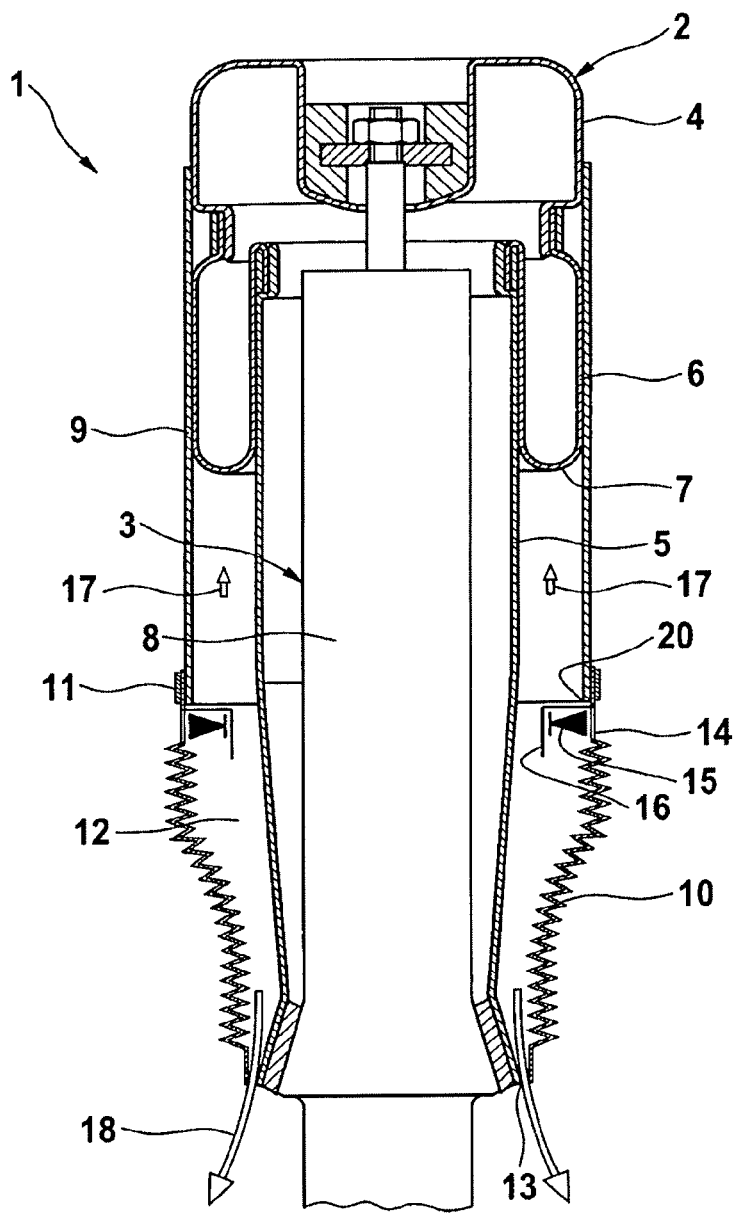
FIG. 1 shows a cutout of a first exemplary embodiment according to the invention of an air spring strut during a spring deflection movement.
Figure 2:
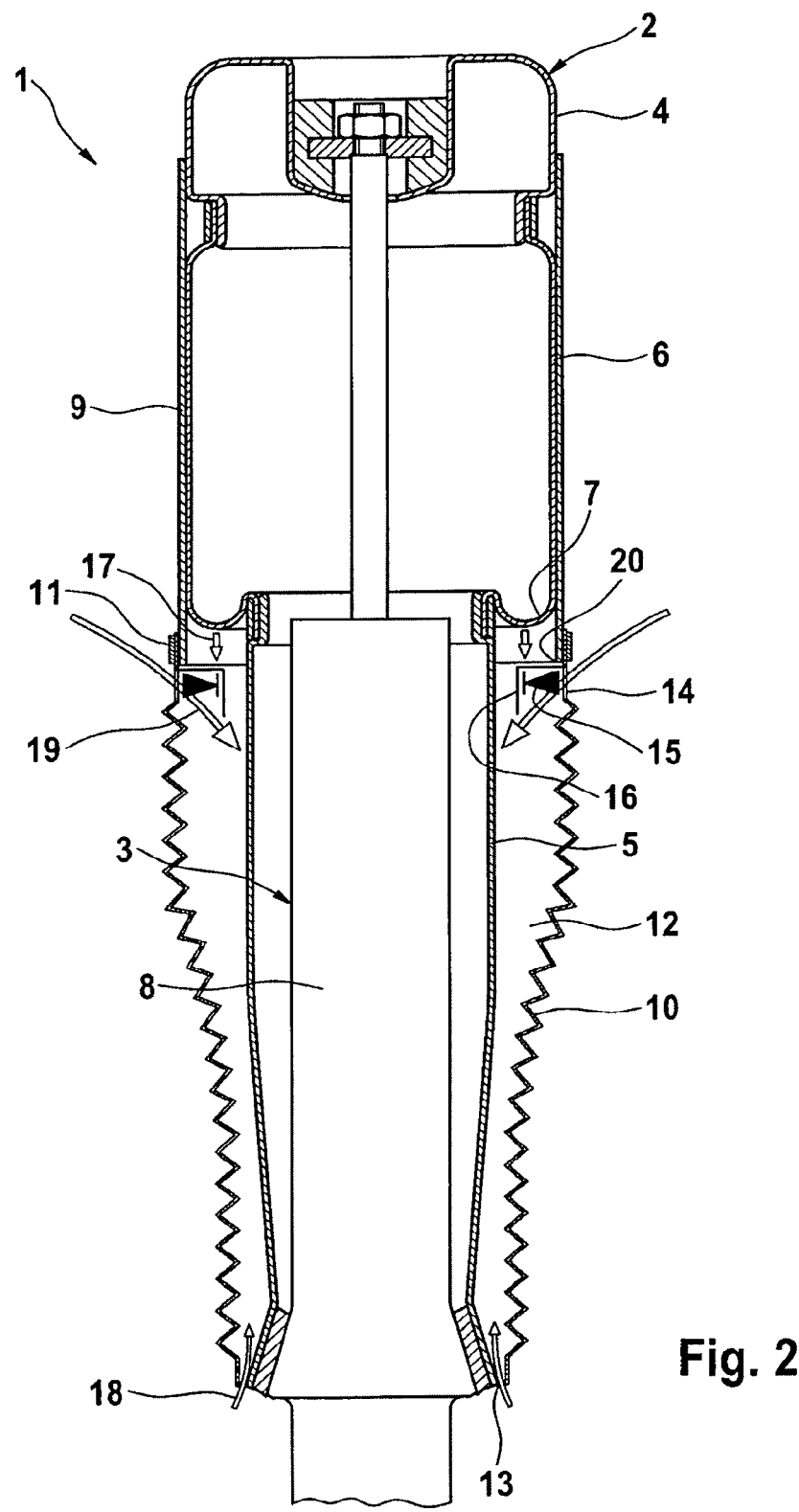
FIG. 2 shows the air spring strut according to FIG. 1 during a rebound movement.

FIGS. 1 and 2 show, in a highly schematic, sectioned illustration, a cutout of a first exemplary embodiment of an air spring strut 1 according to an aspect of the invention which, for spring suspension and damping of vibrations of a motor vehicle chassis, is clamped between the body and the chassis of the motor vehicle and which consists of an air spring 2 and a concentrically arranged damper 3.

The air spring 2 has an air spring bellows 6 which is composed of elastomeric material and is clamped in an airtight manner between an air spring cover 4 and an air spring rolling piston 5. The air spring bellows 6 rolls under load and, in the case of spring movements, rolls, with the formation of a rolling fold 7, on an outer contour of the concentric air spring rolling piston 5 which is fastened to a cylinder tube 8 of the damper 3.

Furthermore, the air spring 2 has an outer guide 9 which encloses the air spring bellows 6 in a sleeve-shaped manner and is fastened to the air spring cover 4 and is designed in such a manner that the air spring bellows 6 can roll firstly on an outer side of the air spring rolling piston 5 and secondly on the inner surface of the outer guide 9.

An expansion bellows 10 is fastened by means of a fastening element 11 to an end of the outer guide 9 that faces away from the air spring cover 4, and protects the rolling fold 7 from dirt accumulations. By means of the use of the expansion bellows 10, the air volume of the space 12 surrounded by the expansion bellows 10 changes at the same time during spring movements of the air spring 2. So that a gas exchange between the air trapped by the expansion bellows 10 and the atmosphere takes place, ventilation openings 13 are provided as ventilation means at an end of the expansion bellows 10 that faces the chassis, i.e. at the foot of the expansion bellows 10. Said ventilation openings 13 can be specially shaped to a greater or lesser extent, for example as rectilinear passages, labyrinths, etc.

Known ventilation means at the foot of the expansion bellows 11 have the disadvantage that, in particular during rebound movements, dust and/or foreign bodies can be sucked into the interior of the expansion bellows. If said particles do not pass to the outside again, but rather get into the rolling region of the air spring bellows 6, the expansion bellows 10 has lost its required protective function and damage to the air spring bellows is not ruled out.

The air spring struts 1 according to an aspect of the invention that are described in more detail below therefore have further additional ventilation openings 14 in the expansion bellows 10, said ventilation openings assisting an air flow within the expansion bellows 10 in the direction of the chassis. As is explained below, the flow conditions, in particular during rebound movements, are fundamentally changed by the additional ventilation openings 14, and therefore a sucking up of the air into the interior of the expansion bellows can be substantially reduced.

The additional ventilation openings 14 are arranged following a fastening region of the expansion bellows 10 to the outer guide 9, and have a smaller flow resistance than the ventilation openings 13, and therefore a larger amount of air can be sucked up through the additional ventilation openings 14, the air being combined with the air flow through the ventilation openings 13 at the foot end of the expansion bellows 10.

Nonreturn means 15 (indicated by an arrow) in the region of the additional ventilation openings 14 hinder or prevent air from exiting from the expansion bellows 10 through the additional ventilation openings 14, which is relevant in particular in the case of spring deflection movements.

Furthermore, means for controlling the airflow 16 within the expansion bellows 10 can be provided in the region of the additional ventilation openings 14, and therefore it can be ensured that the air flowing in through the additional ventilation openings 14 is deflected away from the rolling fold 7.

FIG. 1 shows the first exemplary embodiment in a spring deflection movement (illustrated by an arrow 17), in which the space 12 in the interior of the expansion bellows is reduced and the air (illustrated by an arrow 18) is ejected downward in the direction of the chassis through the ventilation openings 13 at the foot end of the expansion bellows 10. At the same time, the air spring bellows 6 on the outer guide 9 releases an increasing region of the contact surface and covers a potentially soiled region on the air spring rolling piston 5. By means of the nonreturn means 15, the flow conditions during a spring deflection movement remain the same compared with known ventilation means.

During a rebound movement of the air spring 2 (indicated by arrow 17), which is illustrated in FIG. 2, because of the increase in volume in the interior of the expansion bellows, potentially soiled air 18 is sucked in from below. At the same time, the air spring bellows 6 on the outer guide 9 covers an increasing and potentially soiled region of the contact surface and exposes the contact surface on the air spring rolling piston 5.

In comparison with known ventilation means, the flow conditions in the event of rebound movements are fundamentally changed by the additional ventilation openings 14. Soiled air 18 is now sucked in both through the lower ventilation openings 13 and is sucked in through the additional upper ventilation openings 14 (illustrated by an arrow 19). Less air 18 is sucked up at the lower ventilation means because of the smaller flow resistance of the additional ventilation openings 14. The greater amount of the air 19 sucked up at the top will flow into the volume of the expansion bellows below a lower edge 20 of the outer guide 9 since the volume between outer guide 9 and air spring rolling piston 5 decreases above the lower edge 20 of the outer guide 9 and air is thereby pushed out of said region. The direction of flow of the sucked-in air 19 in the direction of the ventilation openings 13 is assisted by the means for controlling the airflow 16.

In the event of successive spring deflection and rebound movements of the air spring 2, a self-cleaning effect of the air in the interior of the expansion bellows occurs:

The airflows in the interior of the expansion bellows 10 are predominantly directed from the additional ventilation openings 14 towards the ventilation openings 13 at the foot end of the expansion bellows 10 with a slight oscillating combination during the spring deflection and rebound movements of the air spring. On average, the ejecting direction of flow is preferred at the foot end of the expansion bellows 10.

Dirt accumulations which arise due to the contaminated air are flushed out in the direction of the chassis at times of a smaller amount of contaminated air.

Figure 3:
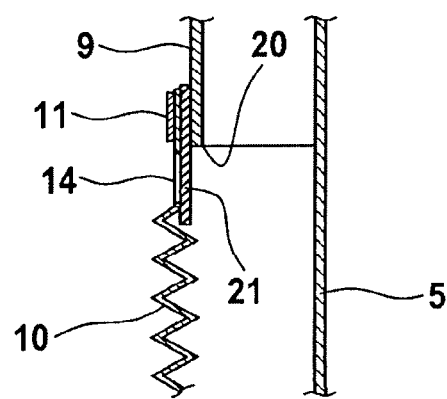
FIG. 3 shows a cutout of a second exemplary embodiment according to the invention of an air spring strut.

FIG. 3 shows a cutout of a second exemplary embodiment. An annular rubber element 21 is provided here in a simple and cost-effective manner as the nonreturn means 15, the rubber element covering the additional ventilation openings 14 on an inner side of the expansion bellows 10 and being fastened in a simple manner between the outer guide 9 and a fastening element 11 of the expansion bellows 10. Said rubber element 21 advantageously serves at the same time for controlling the airflow within the expansion bellows 10, since said rubber element, on being folded over, directs the air in the direction of the ventilation openings 13 at the foot end of the expansion bellows 10.

Figure 4:
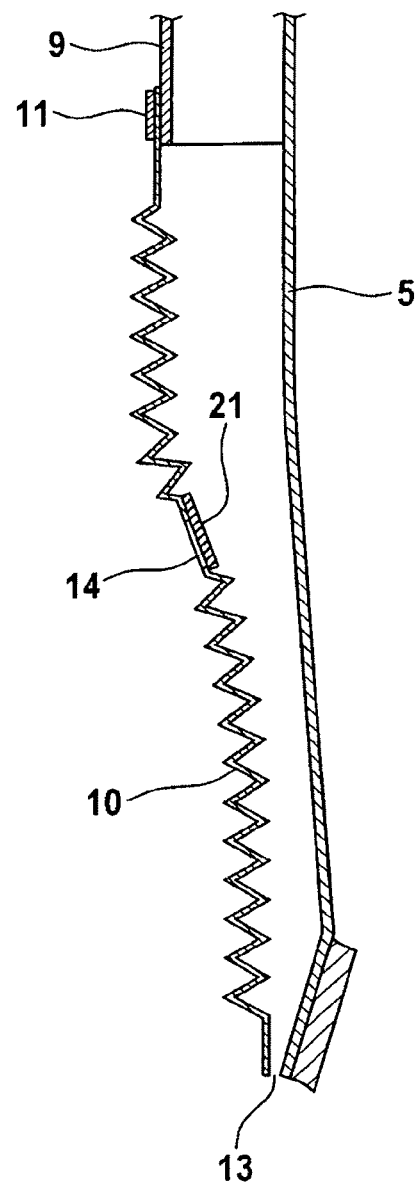
FIG. 4 shows a cutout of a third exemplary embodiment according to the invention of an air spring strut.

However, in the case of expansion bellows 10 of elongate design, it is also possible, according to an exemplary embodiment illustrated in FIG. 4, to arrange the additional ventilation openings 14 in a central region of the expansion bellows 10 and, for example, to fasten the annular rubber element 21 on an inner side of the expansion bellows 10. Alternatively, in the case of ventilation openings 14 in a central region of the expansion bellows 10, a longer rubber element could also be provided which, as described with respect to FIG. 3, is fastened by means of the fastening element 11.

Another design possibility (without an illustration) is the use of commercially available nonreturn valves and other air guiding elements (metal sheets, etc.).

Furthermore, in all of the described exemplary embodiments, one or more filter elements can be arranged in the region of the additional ventilation openings 14. A sucking in of contaminated air through the additional ventilation openings can therefore be prevented. For example, filter elements based on pore size and/or a vortex/cyclone effect could be provided.

LIST OF REFERENCE NUMBERS

1 Air spring strut
 2 Air spring
 3 Damper
 4 Air spring cover
 5 Air spring rolling piston
 6 Air spring bellows
 7 Rolling fold
 8 Cylinder tube
 9 Outer guide
 10 Expansion bellows
 11 Fastening element
 12 Space
 13 Ventilation opening
 14 Ventilation opening
 15 Nonreturn means
 16 Means for controlling the airflow
 17 Spring deflection movement/rebound movement
 18 Air
 19 Air
 20 Lower edge
 21 Rubber element

The invention claimed is:

1. An air spring strut comprising an air spring and a damper for spring suspension and damping of vibrations of a motor vehicle chassis, which air spring strut is clamped between a body and a chassis of a motor vehicle, with an air spring bellows which is composed of elastomeric material, is clamped in an airtight manner between an air spring cover and an air spring rolling piston and rolls on the air spring rolling piston with the formation of a rolling fold, with an outer guide enclosing the air spring bellows in a sleeve-shaped manner, and an expansion bellows which protects the rolling fold from dirt accumulations and which is fastened to an end of the outer guide that faces away from the air spring cover, with ventilation means for ventilating a space surrounded by the expansion bellows, wherein the ventilation means comprise ventilation openings at an end of the expansion bellows that faces the chassis, and further additional ventilation openings are provided in the expansion bellows, said ventilation openings assisting an airflow within the expansion bellows in the direction of the chassis, and wherein a structure for deflecting the airflow away from the rolling fold is provided within the expansion bellows in the region of the additional ventilation openings, the structure comprising a first portion extending inward from an inner surface of the expansion bellows in a radial direction of the damper, and a second portion extending from a radially inner end of the first portion in an axial direction of the damper away from the rolling fold.

2. The air spring strut as claimed in claim 1, wherein the additional ventilation openings have a flow resistance which is smaller than a flow resistance of the ventilation openings.

3. The air spring strut as claimed in claim 1, wherein the additional ventilation openings are arranged following a fastening region of the expansion bellows to the outer guide.

4. The air spring strut as claimed in claim 3, wherein the additional ventilation openings are arranged in a central region of the expansion bellows.

5. The air spring strut as claimed in claim 1, wherein nonreturn means are provided in the region of the additional ventilation openings and at least make an outlet of air from the expansion bellows difficult.

6. The air spring strut as claimed in claim 5, wherein the nonreturn means are provided at the same time for controlling the airflow within the expansion bellows.

7. The air spring strut as claimed in claim 6, wherein an annular rubber element is provided which covers the additional ventilation openings on an inner side of the expansion bellows.

8. The air spring strut as claimed in claim 7, wherein the annular rubber element is provided fastened between the outer guide and a fastening element of the expansion bellows.

9. The air spring strut as claimed in claim 2, wherein the additional ventilation openings are arranged following a fastening region of the expansion bellows to the outer guide.

10. The air spring strut as claimed in claim 1, wherein one or more filter elements are arranged in the region of the additional ventilation openings.

\* \* \* \* \*